(12) United States Patent
Misaki

(10) Patent No.: US 6,900,566 B2
(45) Date of Patent: May 31, 2005

(54) VEHICLE AC GENERATOR

(75) Inventor: Koichi Misaki, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/779,727

(22) Filed: Feb. 18, 2004

(65) Prior Publication Data

US 2004/0164633 A1 Aug. 26, 2004

(30) Foreign Application Priority Data

Feb. 21, 2003 (JP) .................................... 2003-043430
Dec. 16, 2003 (JP) .................................... 2003-417732

(51) Int. Cl.⁷ .............................................. H02K 9/06
(52) U.S. Cl. .................... 310/89; 310/68 D; 310/88; 363/145
(58) Field of Search ................ 310/68 D, 52–64, 310/85, 88, 89; 363/145

(56) References Cited

U.S. PATENT DOCUMENTS

| | | | | |
|---|---|---|---|---|
| 3,701,911 A | * | 10/1972 | Lennart ..................... | 310/60 R |
| 4,162,419 A | * | 7/1979 | DeAngelis ................. | 310/266 |
| 4,491,754 A | | 1/1985 | Gotoh ........................ | 310/88 |
| 4,680,493 A | * | 7/1987 | Ziegler et al. ............. | 310/62 |
| 4,794,285 A | * | 12/1988 | Nimura et al. ............ | 310/68 D |
| 6,784,574 B2 | * | 8/2004 | Turner et al. ............. | 310/58 |
| 2002/0105242 A1 | | 8/2002 | Takahashi et al. ......... | 310/91 |

FOREIGN PATENT DOCUMENTS

| | | |
|---|---|---|
| DE | 197 18 162 A1 | 11/1998 |
| FR | 2 736 770 A1 | 1/1997 |
| FR | 2 800 928 | 5/2001 |
| JP | A 61-251449 | 11/1986 |
| JP | A 10-56760 | 2/1998 |

* cited by examiner

*Primary Examiner*—Dang Le
(74) *Attorney, Agent, or Firm*—Oliff & Berridge, PLC

(57) ABSTRACT

In a vehicle ac generator, a rear cover, which is provided to cover a rectifying device, has a cover body and a protecting wall portion. The cover body forms a plurality of air intake openings through which cooling air created by rotation of a rotor is sucked in the generator. The protecting wall portion is integrally formed with the cover body. The protecting wall portion extends from an axial end surface of the cover body in an axially outward direction of a rotation shaft of the rotor, at a position higher than the air intake openings when the vehicle ac generator is mounted on a vehicle. Therefore, it is less likely that foreign materials such as water and oil will enter the inside of the rear cover from the air intake openings.

11 Claims, 6 Drawing Sheets

VEHICLE AC GENERATOR

CROSS-REFERENCE TO RELATED APPLICATION

This application is based on Japanese Patent Applications No. 2003-43430 filed on Feb. 21, 2003 and No. 2003-417732 filed on Dec. 16, 2003, the disclosure of which are incorporated herein by reference.

FIELD OF THE INVENTION

The present invention relates to a vehicle ac generator mounted on a passenger automobile, a truck and the like.

BACKGROUND OF THE INVENTION

In a vehicle ac generator, electric components such as a rectifying device and a brush device are generally fixed outside of a frame. A protection cover is fixed on the electric components to protect the electric components from foreign materials. The protection cover is formed with air intake openings through which cooling air is sucked in the ac generator with rotation of a rotor for cooling the electric components and a stator winding of a stator. This kind of ac generator is for example disclosed in JP-A-10-56760.

In the ac generator, however, it is likely that foreign materials, such as an erroneously refueled engine oil, oil from a brake fluid, and the drops of cooling water, will enter the inside of the ac generator from the air intake openings. Also, if water enters an engine compartment with dirt splashed by rotating tires and drops on the ac generator, the water will enter in the inside of the ac generator with the flow of cooling air through the air intake openings. If the water adheres to surfaces of metal components in the vehicle ac generator, it will cause the components to rust by oxidation, resulting in abnormal power generation. To restrict the entry of the foreign materials such as oil and water, it is conceived to close the air intake openings. However, if the air intake openings are closed, cooling efficiency is deteriorated. Therefore, it may not be practical in view of a recent high power output trend.

In a vehicle ac generator disclosed in FR2736770A1, a duct member is fixed to a resinous cover so that the opening direction of the air intake openings is changed. Further, a cover member is fixed to the air intake openings to restrict the entry of foreign materials. The duct member has a nail-shaped hook portion to be fixed to the cover. In the ac generator, however, the duct member is a separate part and is fixed to the cover by using the hook structure. Therefore, the number of component parts is increased and the construction of connecting the nail-shaped hook portion is added. As a result, the costs will be largely increased. Further, since the duct member is fixed by using the hook structure, it is difficult to air-tightly seal between the cover and the duct member. Also, if the hook portion is deteriorated, the duct member will be separated from the cover. In addition, a space of an engine compartment has been recently reduced to increase the space for a passenger compartment. Therefore, it is difficult to ensure a space for mounting the ac generator with the large duct member in the engine compartment.

SUMMARY OF THE INVENTION

The present invention is made in view of the above issues, and it is an object of the present invention to provide a vehicle ac generator capable of restricting the entry of foreign materials with a simple configuration and reducing costs.

According to the present invention, a vehicle ac generator includes a stator around which a stator winding is wound, a rotor disposed to oppose the stator on an inner periphery of the stator, a rectifying device that converts ac voltage generated in the stator winding into dc voltage, and a protection cover surrounding the rectifying device. The protection cover includes a cover body and a protecting wall portion integrally formed with the cover body. The cover body forms a plurality of air intake openings on an axial end surface through which cooling air generated by rotation of the rotor is sucked in the protection cover. The protecting wall portion extends in an axially outward direction from an axial end surface of the cover body at a position higher than the air intake openings when mounted on the vehicle.

Accordingly, the foreign materials such as the drops of oil and cooling water are less likely to enter the inside of the vehicle ac generator from the air intake openings. In addition, the cover body and the protecting wall portion are integrally formed into a single piece. Therefore, the number of component parts is reduced and the configuration of the component parts is simplified. Further, costs are reduced.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENTS

Embodiments of the present invention will be described hereinafter with reference to the drawings.

Figure 1:
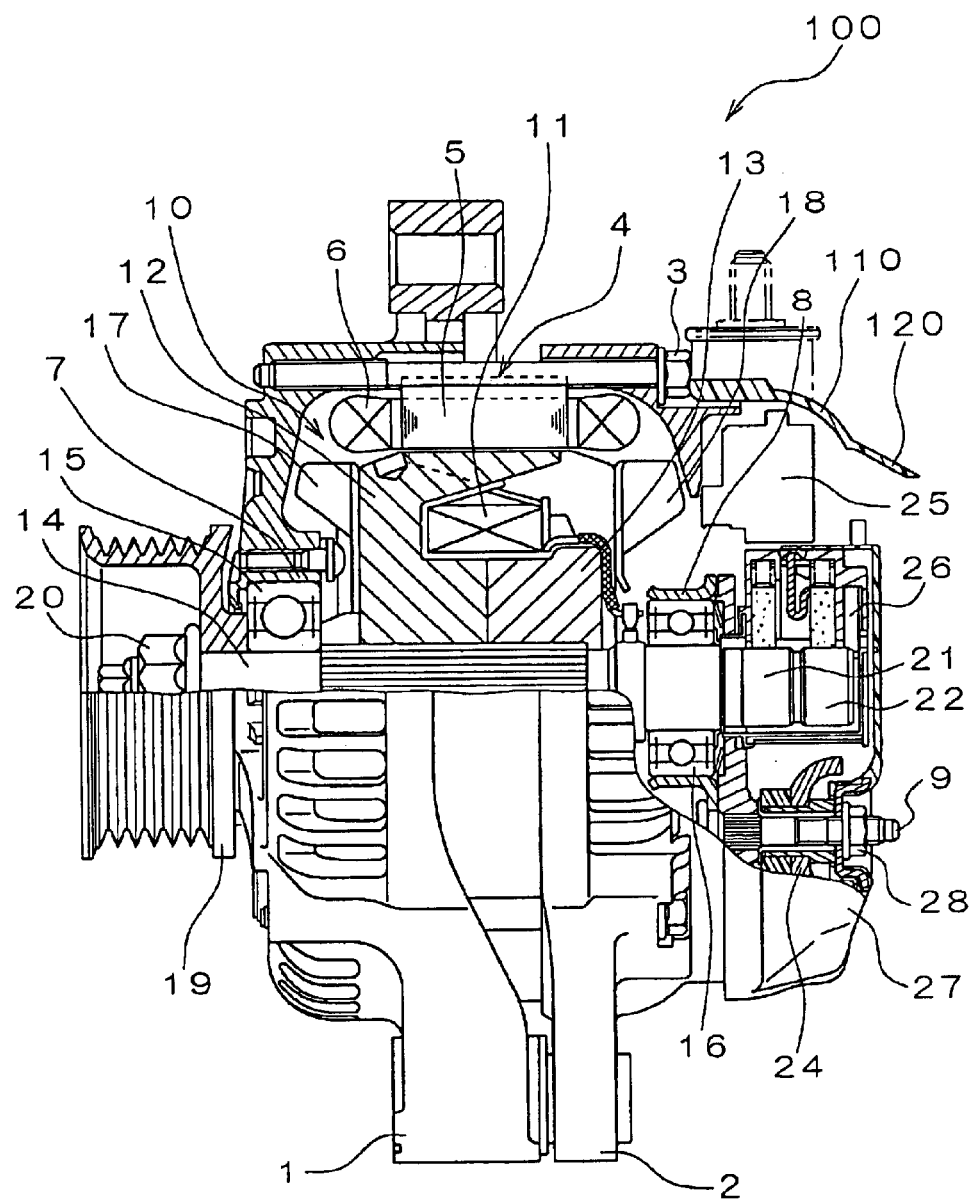
FIG. 1 is a schematic view of a vehicle ac generator, partly including a cross-section, according to a first embodiment of the present invention.

Referring to FIG. 1, a vehicle ac generator 100 is constructed of a front frame 1, a rear frame 2, a stator 4, a rotor 10, a rectifying device 24, a voltage control device 25, a brush device 26, a rear cover 27 and the like.

The front frame 1 and the rear frame 2 are formed in shapes of cups and are fixed to each other by multiple bolts 3 in a condition that the openings of the cup shapes are in contact with each other. The stator 4 is fixed in an inner periphery of the front frame 1. A cylindrical bearing box 7 is integrally formed in the front frame 1. A bearing box 8, which is made of iron, is fixed to the rear frame 2 with bolts 9 having knurls. The stator 4 includes a stator core 5 and a stator winding 6.

The rotor 10 includes a field winding 11, pole cores 12, 13, a rotation shaft 14 and the like. The rotor 10 is located in an inner periphery of the stator 4 and is opposed to the stator 4. The rotor 10 is rotatably supported by a pair of bearings 15, 16 provided in the bearing boxes 7, 8. Centrifugal cooling fans 17, 18 are fixed to axial end surfaces of the pole cores 12, 13. The front cooling fan 17 is a diagonal flow-type fan in which blades are inclined forward with respect to a rotation direction of the rotor 10 to generate flows of cooling air toward the field winding 11.

Also, a pulley 19 is connected to the front end of the rotation shaft 14 by a nut 20 and is rotated by a vehicle engine (not shown). Further, a pair of slip rings 21, 22 are provided on the rear end of the rotation shaft 14 outside of the rear frame 2. The slip rings 21, 22 electrically connect to the field winding 11.

Electric components such as the rectifying device 24, the voltage control device 25, and the brush device 26 are fixed to an axial end surface of the rear frame 2, which is an outside surface of the rear frame 2, by fixing means such as the bolts 9. The rectifying device 24 converts three-phase ac voltage, which is outputted from the three-phase stator winding 6, into dc voltage. The voltage control device 25 controls output voltage of the vehicle ac generator 100 by regulating an exciting current to the field winding 11. The brush device 26 is provided to allow the exciting current from the rectifying device 24 to the field winding 11 of the rotor 10. The brush device 26 is provided with brushes each of which is biased to the corresponding slip ring 21, 22 on the rotation shaft 14.

The rear cover 27 is made of a resin material such as nylon. The rear cover 27 is a protection cover and is arranged at an axial rear end of the ac generator to cover the electric components such as the rectifying device 24, the voltage control device 25, the brush device 26, which are fixed outside of the rear frame 2. The rear cover 27 is fixed by fastening nuts 28 with the bolts 9, which extend through the rear frame 2 in a condition that the rectifying device 24 is sandwiched between the rear cover 27 and the rear frame 2. The rear cover 27 will be described in detail later.

In the vehicle ac generator 100, when a rotational force from the vehicle engine is transmitted to the pulley 19 through a belt (not shown) and the like, the rotor 10 rotates in a predetermined direction. In this condition, an exciting voltage is applied to the field winding 11 of the rotor 10 from the outside. By this, each of claw poles of the poles cores 12, 13 is excited and three-phase ac voltage is generated in the stator coil 6. Accordingly, a predetermined amount of dc current is appeared at an output terminal of the rectifying device 24.

Figure 2:
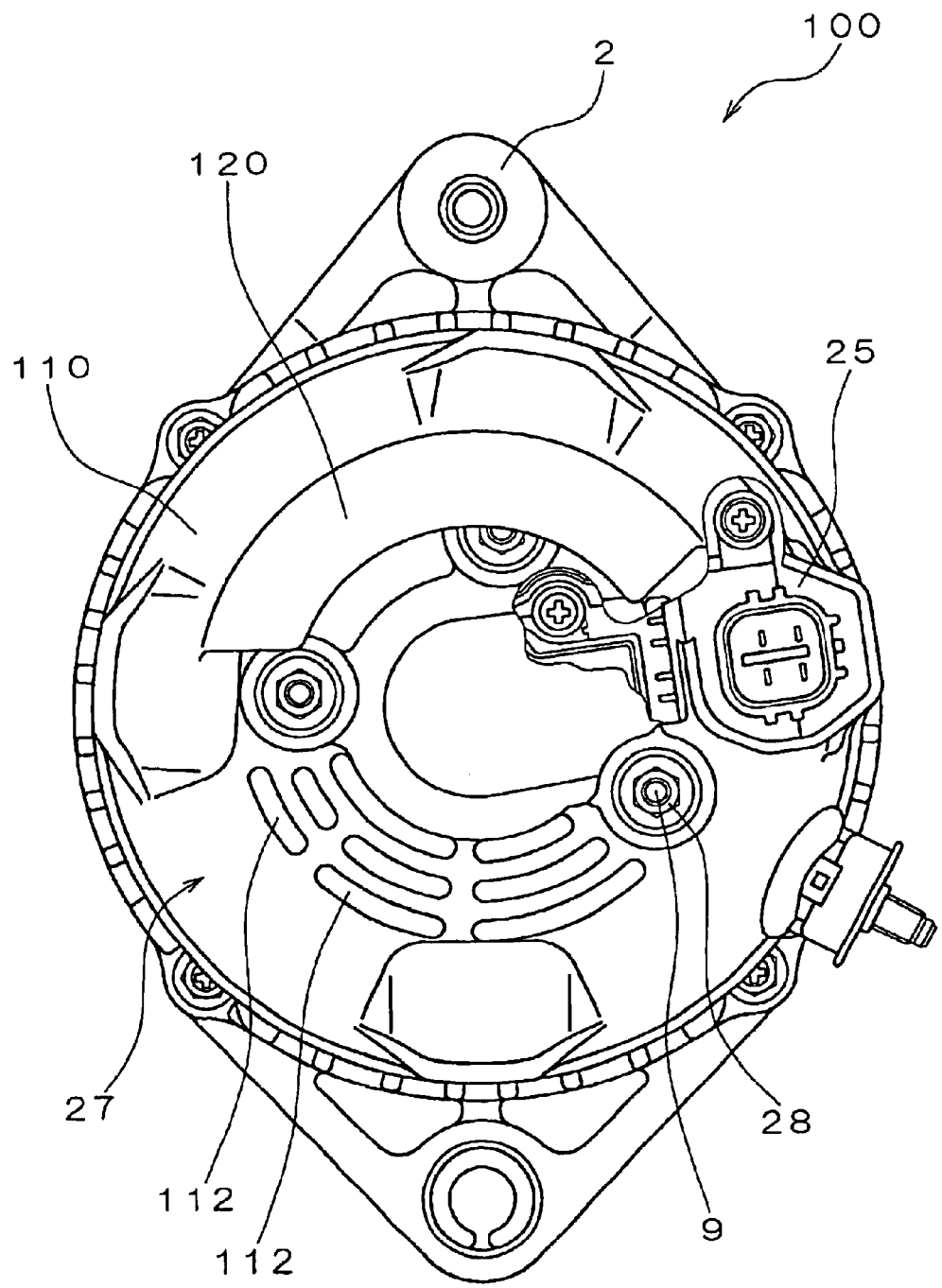
FIG. 2 is an end view of the ac generator, viewed from a rear side, according to the first embodiment of the present invention.

Next, the structure of the rear cover 27 will be described. Referring to FIGS. 1 and 2, the rear cover 27 of the first embodiment includes a cover body 110 and a protecting wall portion 120. Multiple air intake openings 112 are formed on an end surface of the cover body 110, which generally defines an axial end face of the ac generator 100. Cooling air created by the rotation of the rotor 10 is sucked in the ac generator 100 through the air intake openings 112. The air intake openings 112 are substantially concentric with a rotation axis of the rotor 10. The protecting wall portion 120 is integrally formed with the cover body 110.

The protecting wall portion 120 extends from the axial end surface of the cover body 110 to the outside along a longitudinal direction of the rotation shaft 14, that is, extends in an axially outward direction. Also, the protecting wall portion 120 extends from a portion that is higher than the upper perimeter of the air intake openings 112 when the ac generator 100 is mounted on the vehicle.

As shown in FIG. 2, the protecting wall portion 120 is disposed at a position proximate to the air intake openings 112. The protecting wall portion 120 covers the air intake openings 112 from the top without influencing the flows of cooling air. Here, in FIG. 2, the air intake openings 112 are formed also at positions concealed by the protecting wall portion 120.

If a foreign material such as oil and cooling water drops on the ac generator 100 and flows toward the rear cover 27, the foreign material will partly reach the protecting wall portion 120. The foreign material flows downwardly along the surface of the protecting wall portion 120 and then drops from the ends of the protecting wall portion 120. Therefore, it is less likely that the foreign material will enter the inside of the vehicle ac generator 100 from the air intake openings 112.

Particularly, the protecting wall portion 120 is formed at the position proximate to the air intake openings 112, and the top portions of the air intake openings 112 are covered with the protecting wall portion 120. Therefore, the entry of the foreign material into the inside of the rear cover 27 is restricted. Further, since the protecting wall portion 120 is integrally formed into the rear cover 27, the number of component parts is reduced. Also, the configuration of the component parts is simplified. Accordingly, costs are reduced.

Figure 3:
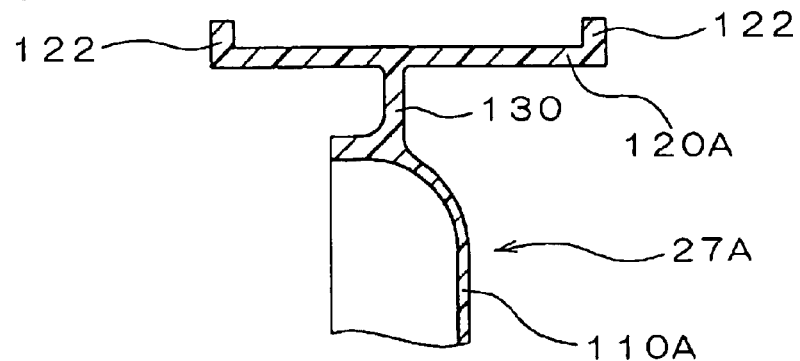
FIG. 3 is a fragmentary cross-sectional view of a rear cover with a protecting wall portion according to a second embodiment.

FIG. 3 shows a second embodiment of the present invention. In the second embodiment, a rear cover 27A has a protecting wall portion 120A that has a shape different from the protecting wall portion 120 of the first embodiment.

Specifically, the rear cover 27A includes a cover body 110A forming the air intake openings 112, the protecting wall portion 120A, and a connecting portion 130 for separating the protecting wall portion 120A from the cover body 110A. The connecting portion 130 and the protecting wall portion 120A are integrally formed with the cover body 110A. The connecting portion 130 extends from an outer periphery of the cover body 110A and the protecting wall portion 120A is located on the outer periphery of the connecting portion 130.

The protecting wall portion 120A is spaced from the cover body 110A through the connecting portion 130 and extends in the axial direction. Therefore, the protecting wall portion 120A covers any portions of the cover body 110A in a wide range. Therefore, the entry of the foreign material is restricted, in view of the actual entering paths of the foreign materials, which may vary according to the mounting position of the vehicle ac generator 100 and the fixing conditions of other onboard devices on the periphery of the vehicle ac generator 100 in the engine compartment. Further, the cover body 110A, the protecting wall portion 120A, the connecting portion 130 are integrally formed into a single piece. Therefore, the number of the component parts is reduced as well as the number of assembling steps is reduced. Accordingly, the costs are reduced.

Further, as shown in FIG. 3, the protecting wall portion 120A is formed with projections 122 as guide portions. The guide portion functions to direct the foreign material, which is dropped on the rear cover 27A, in a downward direction so that the foreign material does not flow toward the air intake openings 112. The foreign material dropped on the water-protection wall portion 120A can be led downwardly along the outer periphery of the protecting wall portion 120A. Therefore, it is less likely that the foreign material will enter the inside of the rear cover 27 from the air intake openings 112.

Particularly, since the guide portions 122 are in the form of projections, the foreign material dropped on the protecting wall portion 120A are led downwardly along the outer periphery of the protecting wall portion 120A without flowing over the projections 122. Therefore, the foreign material is restricted from entering the air intake openings 112 over the ends of the protecting wall portion 120A.

Figure 4:
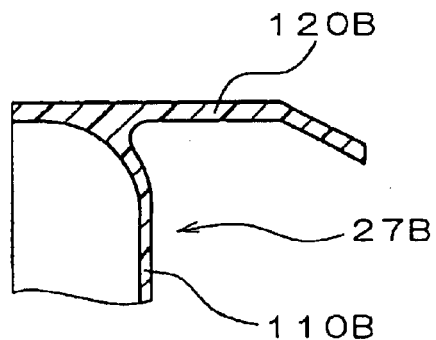
FIG. 4 is a fragmentary cross-sectional view of a rear cover with a protecting wall portion according to a third embodiment.

FIG. 4 shows a third embodiment of the present invention. In the third embodiment, a rear cover 27B has a protecting wall portion 120B that has a shape different from those of the first and second embodiments.

Specifically, the protecting wall portion 120B extends from the outer periphery of a cover body 110B in the axially rearward direction. The protecting wall portion 120B is integrally formed with the cover body 110B. The cover body 110B is formed with the air intake openings 112. The outer periphery of the axial end surface of the rear cover 27B is surrounded with the protecting wall portion 120B. Accordingly, it is less likely that the foreign material dropped from the top will enter the inside of the rear cover 27B through the air intake openings 112.

Figure 5:
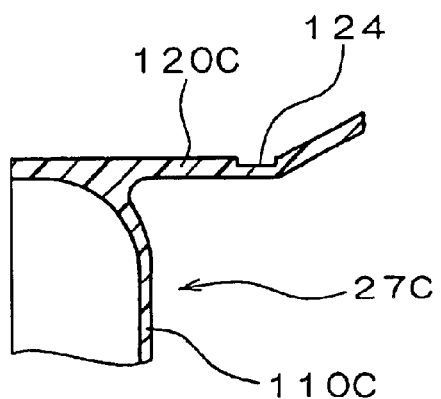
FIG. 5 is a fragmentary cross-sectional view of a rear cover with protecting wall portions according to a fourth embodiment of the present invention.

FIG. 5 shows a fourth embodiment of the present invention. A rear cover 27C of the fourth embodiment has a cover body 110C and a protecting wall portion 120C integrally formed with the cover body 110C. The protecting wall portion 27C extends from the outer periphery of the cover body 110C in the axially rearward direction and further inclines radially outward at the end. Also, the protecting wall portion 120C is formed with a recess 124 at a position proximate to the inclined end, as a guide portion. The guide portion directs the foreign material dropped on the protecting wall portion 120C in a downward direction so that the foreign material does not flow toward the air intake openings 112.

Similar to the rear cover 27B shown in FIG. 4, the periphery of the axial end surface of the rear cover 27C is entirely surrounded with the protecting wall portion 120C. Therefore, it is less likely that the foreign material dropped from the top will flow toward the air intake openings 112 and enter the inside of the rear cover 27C from the air intake openings 112.

Further, the recess 124 is formed on the protecting wall portion 120C as the guide portion. Also, the end of the protecting wall portion 120C is inclined. Therefore, the foreign materials dropped on the protecting wall portion 120C flows in the recess 124 and directs downwardly along the outer periphery of the protecting wall portion 120C. Accordingly, it is less likely that the foreign material dropped on the rear cover 27C from the top will flow toward the air intake openings 112 through the end of the protecting wall portion 120C.

Figure 6:
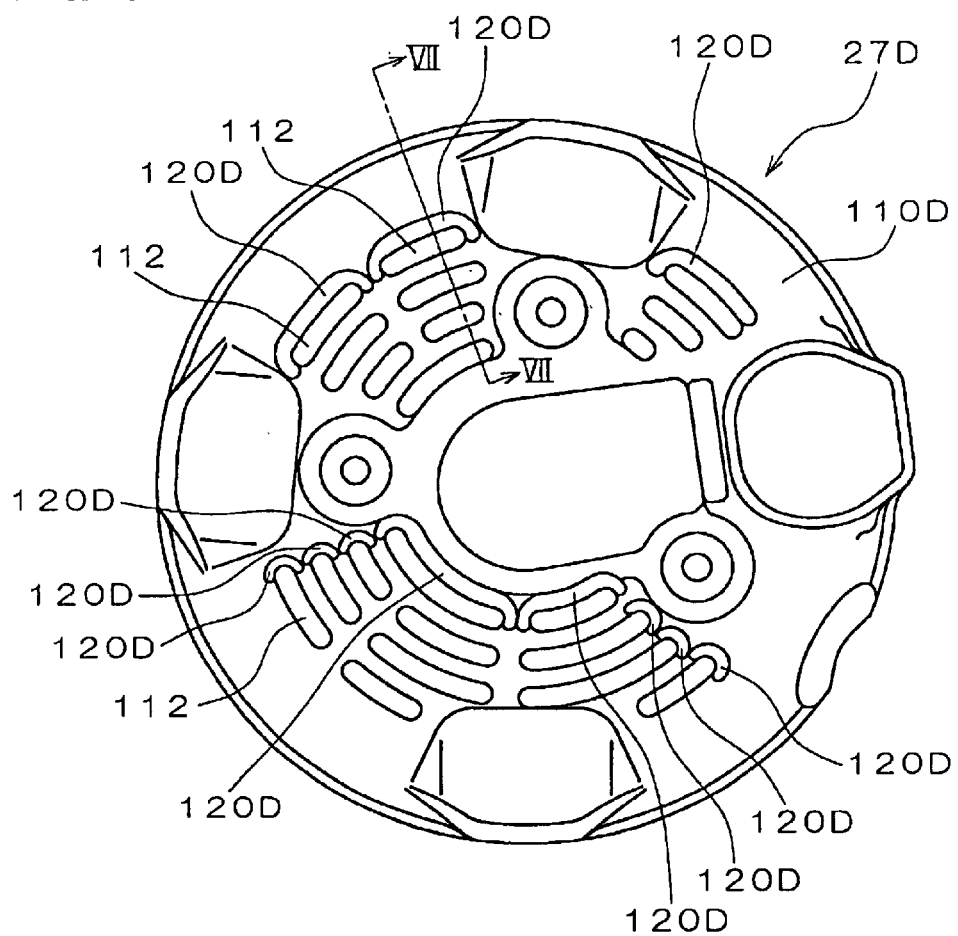
FIG. 6 is a plan view of a rear cover with a protecting wall portion according to a fifth embodiment of the present invention.
Figure 7:
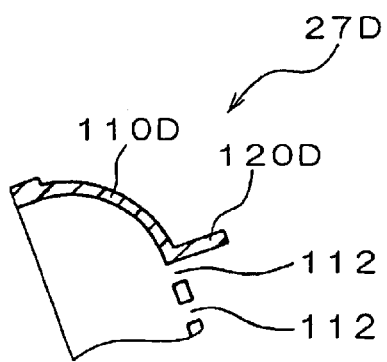
FIG. 7 is a fragmentary cross-sectional view of the protecting wall portion according to the fifth embodiment of the present invention.

FIG. 6 shows a fifth embodiment of the present invention. In the fifth embodiment, a rear cover 27D has a cover body 110D and multiple protecting wall portions 120D integrally formed with the cover body 110D. The air intake openings 112 are formed on the cover body 110D. Each of the protecting wall portions 120D is provided for each of or every plural air intake openings 112. The protecting wall portion 120D is formed at a position proximate to an upper perimeter of the air intake opening 112.

The air intake openings 112 are arranged separately at predetermined positions on the axial end surface of the cover body 110D. If the protecting wall portion is formed to entirely cover the multiple air intake openings 112, a wide area is required to be effective at restricting the entry of the foreign material. That is, the size of the protecting wall portion is increased. In the embodiment, however, the protecting wall portion 120D is formed at the upper perimeter of each air intake opening 112 or every plural air intake openings 112. That is, each protecting wall portion 120D restricts the entry of the foreign material at each of or every plural air intake openings 112. Therefore, the protecting wall portions 120D are formed with a minimum necessary area in accordance with the position and shape of each air intake opening 112. The entry of the foreign material is restricted at the respective air intake openings 112.

Figure 8:
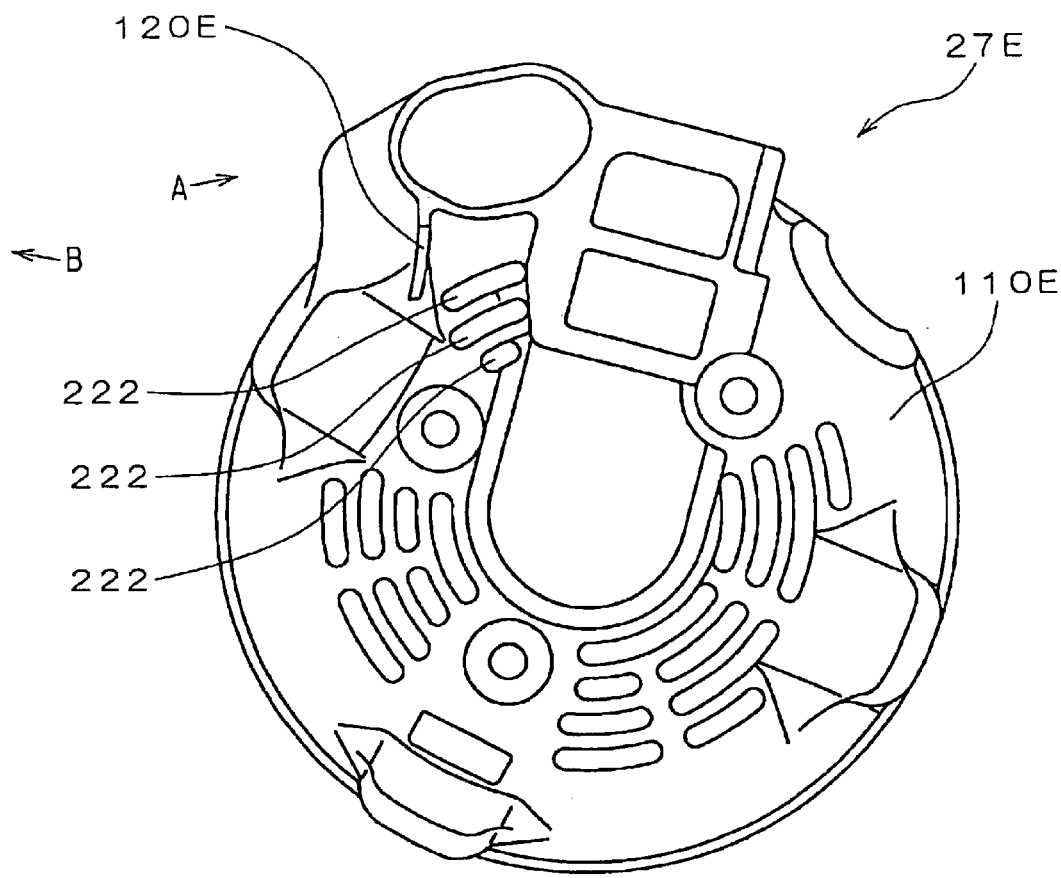
FIG. 8 is a plan view of a rear cover with a protecting wall portion according to a sixth embodiment of the present invention.
Figure 9:
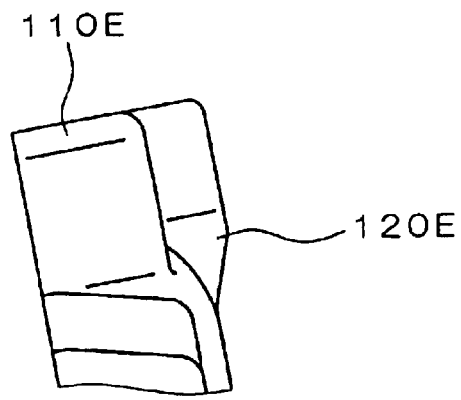
FIG. 9 is a side view of the protecting portion shown in FIG. 8.

FIG. 8 shows a sixth embodiment of the present invention. In the sixth embodiment, a rear cover 27E has a cover body 110E and a protecting wall portion 120E integrally formed with the cover body 110E. FIG. 9 shows a side view of the rear cover 27E viewed along an arrow A of FIG. 8. The cover body 110E is formed with air intake openings 222 through which the cooling air is sucked. The protecting wall portion 120E is formed above some of the air intake openings 222 to cover some of air intake openings 222. In FIG. 8, an arrow B denotes an upward direction.

Figure 10:
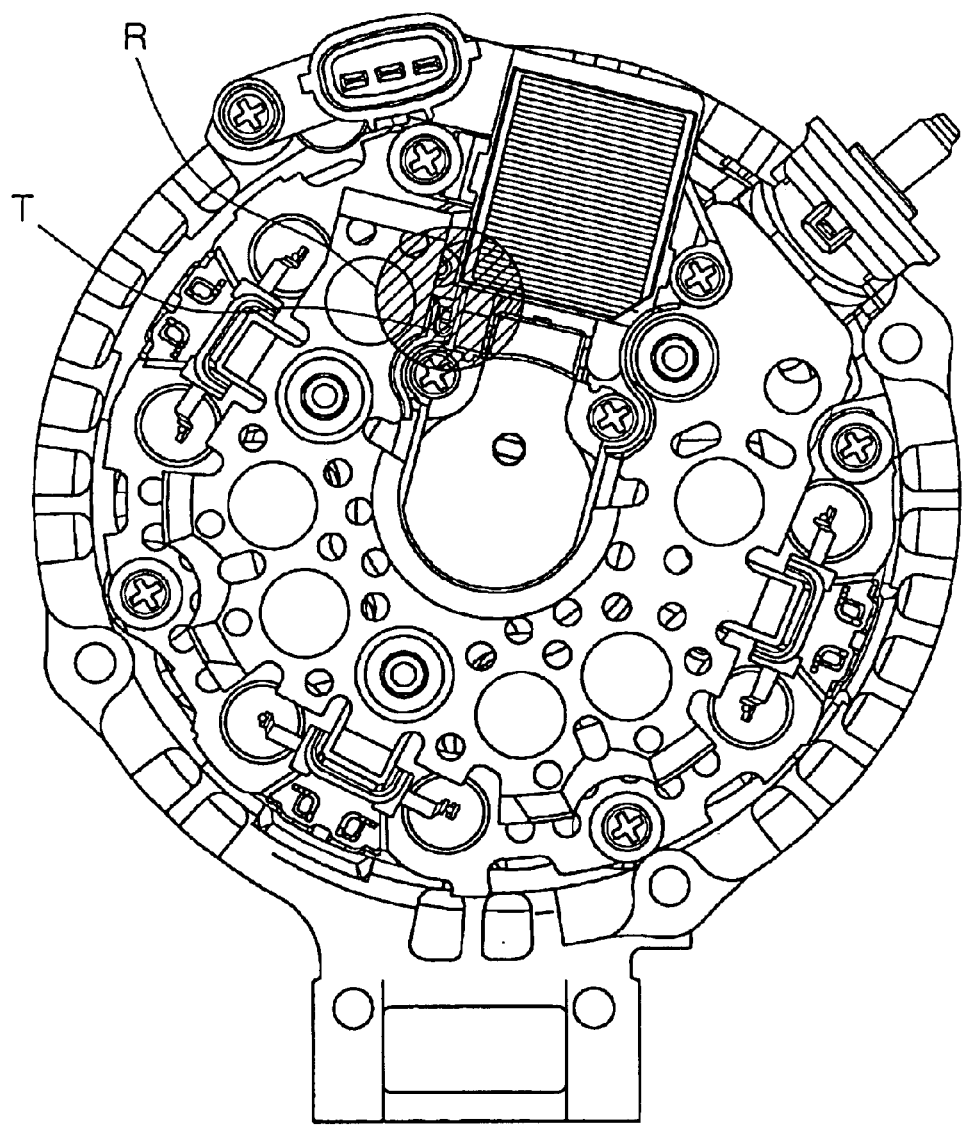
FIG. 10 is an end view of a vehicle ac generator when the rear cover shown in FIG. 8 is removed.

FIG. 10 shows an end view of the vehicle ac generator 100 when the rear cover is removed. A terminal T that connects the rectifying device 24 and the voltage control device 25 is located in a shade area R of FIG. 10. Since the protecting wall portion 120E is formed to cover the air intake openings located proximate to the region R, it is less likely that the foreign material will enter the region R. Accordingly, the protecting wall portion 120E is effective to protect the terminal T and the periphery. Since the protecting wall portion 120E is formed at the position to be protected, the area or size of the protecting wall portion 120E is reduced.

In the above embodiments, the rear cover 27 is made of the resin material. Alternatively, the rear cover can be formed of a metallic material such as aluminum or iron.

The present invention should not be limited to the disclosed embodiment, but may be implemented in other ways without departing from the spirit of the invention.

What is claimed is:

1. A vehicle ac generator, comprising:
   a stator having a stator winding;
   a rotor disposed to oppose the stator in an inner periphery of the stator;
   a rectifying device that converts ac voltage generated in the stator winding into dc voltage; and
   a protection cover surrounding the rectifying device, wherein
   a protection cover includes a cover body and a protecting wall portion intearally formed with the cover body,
   the cover body forms a plurality of air intake openings on an axial end surface through which cooling air created by rotation of the rotor is sucked in,
   the protecting wall portion extends from the axial end surface of the cover body in an axially outward direction at a position higher than the air intake openings when mounted on a vehicle, and the protection cover further includes a connecting portion integrally formed therein, the connecting portion is located between the cover body and the protecting wall portion such that the protecting wall portion is held at a position separate from the cover body.

2. A vehicle ac generator, comprising:

a stator having a stator winding;

a rotor disposed to oppose the stator in an inner periphery of the stator;

a rectifying device that converts ac voltage generated in the stator winding into dc voltage; and a protection cover surrounding the rectifying device, wherein a protection cover includes a cover body and a protecting wall portion integrally formed with the cover body, the cover body forms a plurality of air intake openings on an axial end surface through which cooling air created by rotation of the rotor is sucked in, the protecting wall portion extends from the axial end surface of the cover body in an axially outward direction at a position higher than the air intake openings when mounted on a vehicle, and the protecting wall portion is formed with a guide portion for leading foreign materials dropped on the protecting wall portion in a downward direction.

3. The vehicle ac generator according to claim 2, wherein the protecting wall portion is disposed proximate to the air intake openings.

4. The vehicle ac generator according to claim 3, wherein the protection cover further includes a plurality of protecting wall portions including the protecting wall portion, and each of the protecting wall portions is provided for one of each air intake opening and a plurality of air intake openings.

5. The vehicle ac generator according to claim 2, wherein the guide portion is in a form of projection.

6. The vehicle ac generator according to claim 5, wherein the projection is formed along an axial end of the protecting wall portion.

7. The vehicle ac generator according to claim 2, wherein the guide portion is a recess formed on the protecting wall portion.

8. The vehicle ac generator according to claim 7, wherein the protecting wall portion has an inclined portion that is inclined radially outside and the recess is formed at a position proximate to the inclined portion.

9. The vehicle ac generator according to claim 2, wherein the air intake openings are concentric with a rotation axis of the rotor, and the protecting wall portion is formed to extend from an upper perimeter of the air intake opening.

10. The vehicle ac generator according to claim 2, wherein a terminal is provided to connect the rectifying device and a voltage control device, and the wall portion is provided near the terminal to protect the terminal from foreign material.

11. The vehicle ac generator according to claim 2, wherein a voltage control device is provided to control an exciting current to a field winding of the rotor, and the wall portion is provided over the voltage control device.

* * * * *